Oct. 21, 1947. M. MALLORY 2,429,270
MULTIPLE CYLINDER ENGINE, THROTTLE CONTROL
Filed March 30, 1945
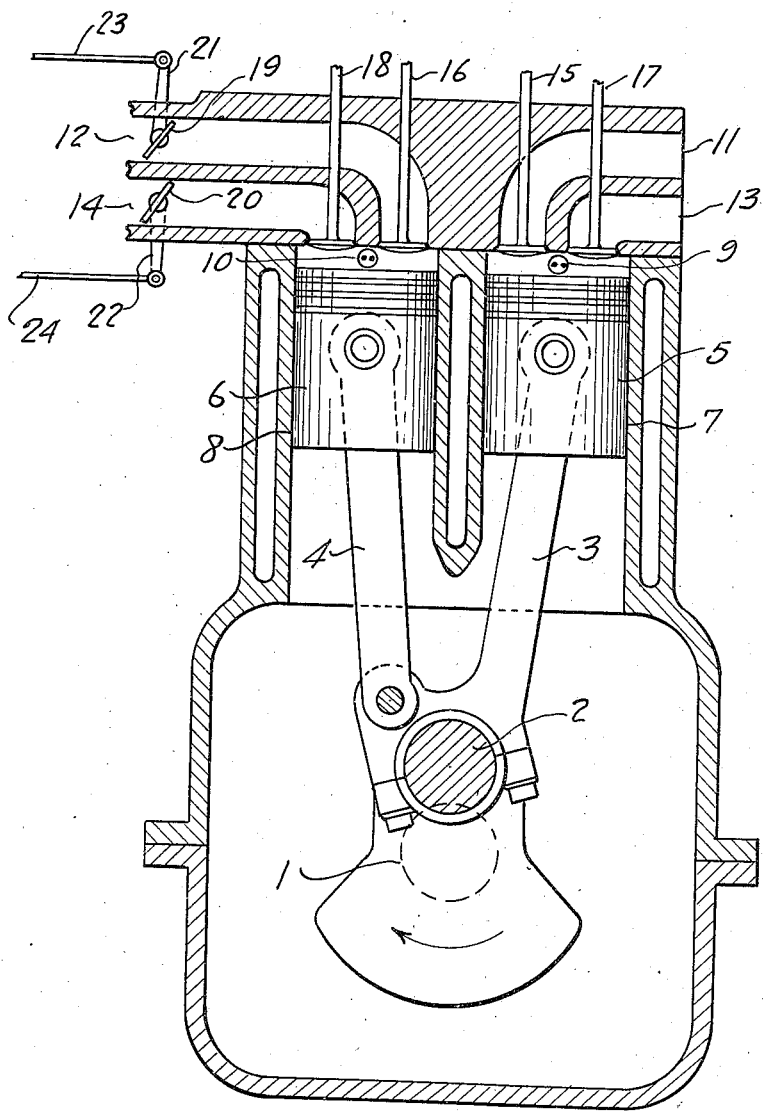
INVENTOR.
Marion Mallory
BY
Barnes, Kisselle, Laughlin & Raisch
Attorneys Patented Oct. 21, 1947

2,429,270

UNITED STATES PATENT OFFICE 2,429,270

MULTIPLE CYLINDER ENGINE THROTTLE CONTROL

Marion Mallory, Detroit, Mich.

Application March 30, 1945, Serial No. 585,661

4 Claims. (Cl. 123—54)

This invention relates to an internal combustion engine.

It is well-known that an internal combustion engine develops more horse-power per pound of fuel used when operating on wide open throttle than it does on part throttle.

This invention contemplates an engine wherein the cubic inch cylinder displacement can be varied so that when operating under both light and heavy loads the engine can be operated more nearly at what amounts to wide open throttle. Thus, it is an object of my invention to produce an engine which will operate very efficiently and economically and which will operate as a large engine to produce the necessary power for acceleration and hard pulls and operate as a small engine for economy when operating under light loads.

The drawing is a vertical section showing my engine.

The parts of my engine are as follows: crankshaft 1, crank 2, connecting rods 3 and 4, pistons 5 and 6, cylinders 7 and 8, electric spark plugs 9 and 10, intake passageways 11 and 12, exhaust passageways 13 and 14, intake valves 15 and 16, exhaust valves 17 and 18, butterfly throttle valves 19 and 20, respectively, for intake passageway 12 and exhaust passageway 14, cranks 21 and 22 connected to butterfly valves 19 and 20, respectively, for operating the same, and rods 23 and 24 for operating cranks 21 and 22, respectively. Intake passageways 11 and 12 will each be connected to a source of carburetted fuel, such as a carburetor (not shown).

As herein shown for illustrative purposes, my engine is a four cycle engine and intake valves 15 and 16 and exhaust valves 17 and 18, for the respective cylinders, will be operated in the conventional manner of the four cycle internal combustion engine.

In my engine the cylinders are arranged in pairs close together and parallel to each other. Since the pistons are connected to the same throw of the crankshaft, they operate practically simultaneously and the cylinders are charged, the charge compressed, ignited and exhausted practically simultaneously. However, each cylinder is charged, the charge compressed, ignited and exhausted independently of the other cylinder. The pistons are shown connected to the same throw of the crankshaft for illustrative purposes and not by way of limitation and it is obvious that the exhaust and intake valves and ignition timing can be arranged so that the two cylinders 7 and 8 fire alternately.

If it is desired to cut out one of the cylinders, such, for example, as cylinder 8, I simply swing butterfly valves 19, 20 to fully closed position so that they tightly close off intake passageway 12 and exhaust passageway 14. At this time power will be supplied by cylinder 7 from this power unit and, although valves 16 and 18 will continue to open and close in the conventional manner, there will be no pumping loss. In other words, as piston 6 moves downwardly there is no charge drawn in and there will be no compression in the cylinder. If there is a vacuum on the downward stroke of the piston, there will be a vacuum on the upward stroke, which neutralizes the forces, or, if there is compression on the upward stroke, there will be compression on the downward stroke. When valves 19 and 20 are closed tightly, there is just as much pressure on the downward stroke as there is on the upward stroke, regardless of whether the pressures are sub-pressure or above atmospheric.

When operating with valves 19 and 20 closed and only cylinder 7 working, the effect will be reducing the size of the engine to one half. Naturally, to maintain the power it will be necessary to open the carburetor valve for cylinder 7 wider than it would be when both cylinders 7 and 8 were operating. Wider opening of throttle valve for cylinder 8 would mean higher compression or give the same effect as if the operator were using a small engine, which would naturally give greater economy than the large engine. In the event full power of the large engine is desired, valves 19 and 20 are brought into use or opened. These valves can be operated manually, automatically or by any well-known manner.

When the engine is pulling a heavy load or it is desired to accelerate the speed of the engine, valves 19 and 20 will be opened wide and the engine will be operated in the same manner as the conventional four cycle engine. If the engine load becomes light, then cylinder 8 will be closed off, as above described, and cylinder 7 of each power unit will be used to carry the light load. This will permit cylinder 7 to be operated at wide open throttle which produces economical operation.

I claim:

1. An internal combustion engine comprising a plurality of cylinders, a piston for each cylinder, intake and exhaust ports for each cylinder, valves for controlling said ports, an intake passageway for each of said intake ports, an exhaust passageway for each of said exhaust ports, the said intake valves for each cylinder opening on the charging stroke of said pistons and the said exhaust valves opening on the exhaust stroke of said pistons, and valve means for the intake and exhaust passageways of one of said cylinders whereby the intake and exhaust passageways for said cylinder can be closed and when only part of the potential power of said engine is desired such cylinder can be rendered inoperative and the power lost on the down stroke of the piston for such cylinder tends to be compensated for on the up stroke of said piston while the said valve means remain closed.

2. An internal combustion engine comprising a plurality of cylinders, a piston for each cylinder, intake and exhaust ports for each cylinder, valves for controlling said ports, an intake passageway for each of said intake ports, an exhaust passageway for each of said exhaust ports, the said intake valves for each cylinder opening on the charging stroke of said pistons and the said exhaust valves opening on the exhaust stroke of said pistons, and a valve in the intake passageway and a valve in the exhaust passageway of one of said cylinders whereby the intake and exhaust passageways for said cylinder can be closed and while the said valves in the intake and exhaust passageways for said cylinder remain closed said cylinder is inoperative and the power lost on the down stroke of the piston for said cylinder tends to be compensated for on the up stroke of said piston.

3. In an internal combustion engine comprising at least one power unit which consists of a plurality of cylinders, a piston for each cylinder, intake and exhaust ports for each cylinder, valves for controlling said ports, the cylinders of each power unit being arranged to charge, compress, fire and exhaust approximately simultaneously, an intake passageway leading to the intake port for each cylinder, an exhaust passageway leading from the exhaust port of each cylinder, a valve in the intake passageway and a valve in the exhaust passageway for one of said cylinders, and means for holding said valves in the exhaust and intake passageways for one of said cylinders of said power unit closed whereby when only part of the potential power of said engine is desired said cylinder of each power unit can be rendered inoperative but the number of power strokes per crankshaft revolution of said engine remains the same as when all the cylinders of said power unit are operating.

4. An internal combustion engine comprising a plurality of cylinders, a piston for each cylinder, intake and exhaust ports for each cylinder, poppet valves for controlling said ports, an intake passageway leading to the intake port for each cylinder, an exhaust passageway leading from the exhaust port for each cylinder, a butterfly valve in the exhaust passageway and a butterfly valve in the intake passageway for one of said cylinders whereby when the butterfly valves are closed such cylinder is rendered inoperative and the power lost on the downstroke of the cylinder for said piston tends to be compensated for on the up stroke of said piston.

MARION MALLORY.

REFERENCES CITED

The following references are of record in the file of this patent:

UNITED STATES PATENTS

| Number | Name | Date |
|--------|------|------|
| 1,128,717 | Ottoway | Feb. 16, 1915 |
| 1,159,985 | Orlopp | Nov. 9, 1915 |
| 1,574,130 | Smith | Feb. 23, 1926 |
| 1,955,661 | Waldo | Aug. 17, 1934 |
| 2,250,814 | Rohlin | July 29, 1941 |
| 1,275,752 | Roberts | Aug. 13, 1918 |
| 1,048,610 | Wallace | Dec. 31, 1942 |
| 2,392,933 | Mallory | Jan. 15, 1946 |